United States Patent
Tamaki et al.

[19]

[11] Patent Number: 6,006,160
[45] Date of Patent: Dec. 21, 1999

[54] SYSTEM AND METHOD FOR DESIGNATING POINTS ON A MAP USING REDUCED DESIGNATION INFORMATION

[75] Inventors: Kazuyoshi Tamaki, Nagoya; Yoshimasa Furuike, Nukata-gun; Takao Mitsui, Chita-gun, all of Japan

[73] Assignee: Denso Corporation, Kariya, Japan

[21] Appl. No.: 08/815,088

[22] Filed: Mar. 11, 1997

[30] Foreign Application Priority Data

Mar. 11, 1996 [JP] Japan ................................. 8-053161
Jan. 30, 1997 [JP] Japan ................................. 9-016476

[51] Int. Cl.$^6$ .......................... G01C 21/00; G06F 165/00
[52] U.S. Cl. ............................... 701/208; 340/995
[58] Field of Search ................................ 701/208, 213; 340/995

[56] References Cited

U.S. PATENT DOCUMENTS

| | | | |
|---|---|---|---|
| 4,737,927 | 4/1988 | Hanabusa et al. | 364/443 |
| 4,796,189 | 1/1989 | Nakayama et al. | 364/449 |
| 5,237,323 | 8/1993 | Saito et al. | 340/995 |
| 5,285,391 | 2/1994 | Smith, Jr. et al. | 364/443 |
| 5,424,951 | 6/1995 | Nobe et al. | 364/443 |
| 5,635,953 | 6/1997 | Hayami et al. | 345/146 |
| 5,812,962 | 9/1998 | Kovac | 701/208 |
| 5,839,088 | 11/1998 | Hancock et al. | 701/213 |

FOREIGN PATENT DOCUMENTS

| | | |
|---|---|---|
| 60-239876 | 11/1985 | Japan . |
| 63-197986 | 8/1988 | Japan . |
| 6-088735 | 3/1994 | Japan . |
| 7-060479 | 6/1995 | Japan . |

*Primary Examiner*—Michael J. Zanelli
*Attorney, Agent, or Firm*—Pillsbury Madison & Sutro, LLP

[57] ABSTRACT

A map of an entire region is divided into sections of a square of 900", each of which is further divided into blocks of a square of 30", each of which is further divided into units of a square of 1", so that a region on the map can be hierarchically designated. Each section is defined with section codes of three figures; each block is defined with block codes of three figures in accordance with its relative positional relation in the section; and each unit is defined with unit codes of three figures in accordance with its relative positional relation in the block, so that each unit can be completely differentiated with an intrinsic code of nine figures composed of those three kinds of codes. As to the section code composing the intrinsic code corresponding to the predetermined region, moreover, a number of significant digits is reduced by assigning a lower number in the code system, so that the manual operations of inputting the intrinsic code of the predetermined region can be lightened.

38 Claims, 5 Drawing Sheets

SYSTEM AND METHOD FOR DESIGNATING POINTS ON A MAP USING REDUCED DESIGNATION INFORMATION

CROSS-REFERENCE TO RELATED APPLICATIONS

The present invention is related to and claims priority from Japanese Patent Application Nos. Hei 8-53161 and Hei 9-16476, incorporated herein by reference.

BACKGROUND OF THE INVENTION

1. Field of the Invention

The present invention relates to a point specifying method and system, and a map displaying method and system using the same.

2. Description of Related Art

In prior art car navigation, the latitude and longitude of a point are typically input to specify the point. Japanese Patent Publication No. Hei 7-60479, however, discloses a system in which a map database is further stored as well as its corresponding relationships with a telephone number or address and a building so that the point is specified by inputting the telephone number.

Also, Japanese Patent Laid-Open No. Hei 6-88735 discloses a system in which individual registration numbers are assigned to the points (e.g., the intersections, the road starting points or arbitrary points between the intersections) so that the point is specified with the registration number.

However, the method of specifying the point with the latitude and longitude requires inputting two unknown parameters (the latitude and longitude) and has complicated inputting operations. Because of using the two unknown parameters, moreover, the specification of a position will be incorrect if the inputting order is wrong. Thus, this method is disadvantageous in that it has a poor operability.

On the other hand, the method of specifying the point with the telephone number or the address requires assembly of relationships among the telephone numbers, the buildings and the map into the database. This requirement raises a problem in that the point cannot be specified based on the latest information unless the database is always updated. In the method of specifying the point with the registration number, there is also a similar problem in that the database has to be updated if a new road is made.

SUMMARY OF THE INVENTION

It is, therefore, an object of the present invention to make it possible to specify a point simply and to specify a point and display the map near the point based on a new map if only this map is updated.

The above object is achieved according to a first aspect of the preset invention by dividing a map into multiple map regions according to a predetermined coordinate system, selecting given ones of the map regions according to predetermined criteria to obtain selected regions, and assigning unique indicia to the map regions, where the indicia including a first group of indicia and a second group of indicia each having fewer significant digits than indicia in said first group of indicia, and where the assigning step includes a step of assigning indicia from the second group to the selected regions.

Preferably, the map is divided hierarchically into multiple levels. It may be divided on a first level into multiple low-resolution portions such as sections, and each of the sections may be divided into multiple higher-resolution portions. For example, each of the sections may be divided into multiple higher-resolution portions such as blocks, with each of the blocks being divided into units.

In this way, codes can be assigned to the sections so that the codes for sections most frequently accessed have fewer significant digits that those of less frequently accessed sections. Since fewer numbers need be input by a user wishing to designate a navigation point, the ease of use of the system is increased. Further, since only one piece of information need be input (rather than two in the case of latitude-longitude entry), there is less likelihood of an erroneous entry.

Some of the units codes may be replaced by codes which do not designate a geographic area, but which instead designate a specific facility in an area; for example, a given code might indicate a hospital, rather than the general area in which the hospital is located. This feature also increases the usefulness of the system to a user because similar facilities in different areas may be designated by identical codes; thus, a user need only input the general code for, say, hospitals, rather than looking for the code designating a particular hospital in a specific region. This technique need not be used exclusively of the unit code arrangement, and both may be used simultaneously as long as the unit codes and facility codes do not overlap.

Ease of use of the system is further enhanced by allowing the user to associate descriptive information with particular location. At a later point in time, the user can recall the location by inputting the descriptive information, and he or she need not remember the specific code corresponding to that location.

The above object is further achieved according to additional aspects of the present invention by providing a navigational method and a navigational system adhering to the above criteria.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

Figure 1:
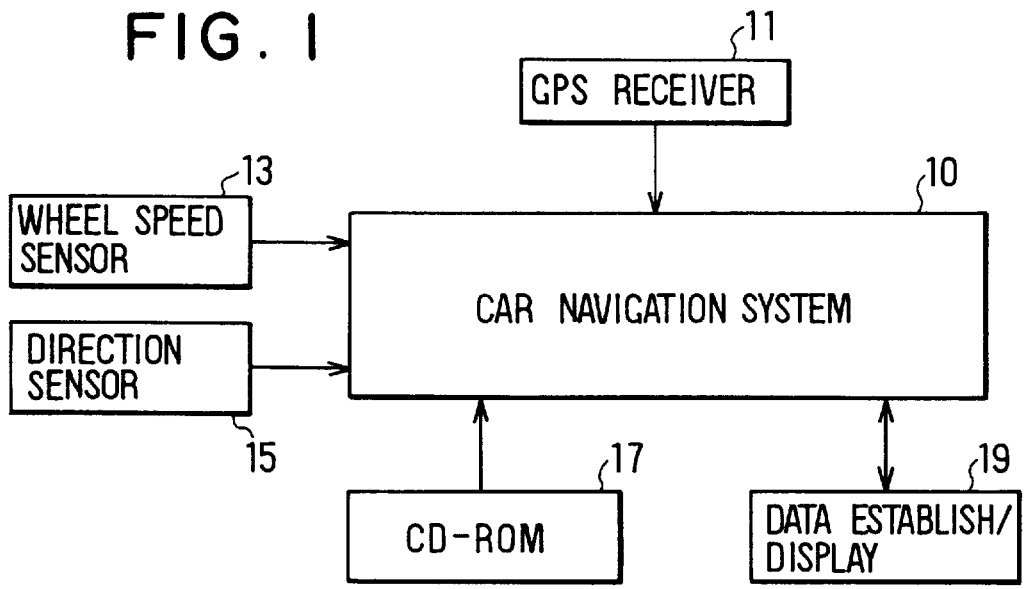
FIG. 1 is a block diagram showing a system according to a first preferred embodiment of the present invention.

DETAILED DESCRIPTION OF THE PRESENTLY PREFERRED EXEMPLARY EMBODIMENTS First Embodiment A car navigation system 10 according to a first preferred embodiment of the present invention has connected thereto a GPS receiver 11 for receiving signals from GPS satellites; a wheel speed sensor 13; an azimuth sensor 15 including a yaw rate sensor or a geomagnetic sensor; a CD-ROM drive unit 17 for accessing a CD-ROM having a map database stored therein; and data setting and display unit 19. The data setting and display unit 19 is equipped with a screen for displaying a map, a speaker for audio output, and a control panel for inputting various commands, numerical values and so on.

This car navigation system 10 includes a microprocessor 10 having a CPU, a ROM, a RAM and the like and uses, in combination, GPS navigation for calculating an absolute position of the vehicle based on the received radio waves of the GPS receiver 11, and self-contained navigation for calculating the moving direction and the covered distance of the vehicle based on detected signals from the wheel speed sensor 13 and the azimuth sensor 15. The car navigation system 10 calculates the present position of the vehicle by GPS navigation when signals can be received from the GPS satellites, and it calculates the present position by self-contained navigation when GPS signals cannot be received, to guide the traveling route by superposing the calculated present position and the map database in the CD-ROM.

This CD-ROM is stored with the database of a map of an entire region, e.g., the entire country of Japan, which is expressed according to the latitude-longitude coordinates.

In this embodiment, moreover, the aforementioned map database is constructed so that the whole map can be designated at the unit of a primary mesh composed of measures of latitude×longitude=900"×900". This database is also constructed so that the region in each measure of the primary mesh can be further designated as the unit of a secondary mesh composed of latitude×longitude of 30"×30", and is further constructed so that the region in each measure of the secondary mesh can be further designated as the unit of a ternary mesh composed of latitude×longitude= 1"×1". This relation is schematically illustrated in the hierarchical structure of FIG. 2.

In this embodiment, the hard disk of the car navigation system 10 is stored in a tabulated form with code numbers for specifying the measures of the primary mesh, as shown in TABLE I below. The primary mesh is composed of 1,000 measures at most, the code numbers of which are represented by three-digit number from "000" to "999", corresponding one-to-one to the individual measures of the primary mesh. In the following discussion, these three-digit numbers will be called the "section codes"; the measures of the primary mesh will be called the "sections"; and TABLE I will be called the "section code table". Incidentally, this section code table uses the same latitude×longitude coordinate system as that of the map database.

TABLE I

| SECTION CODE | LATITUDE | LONGITUDE |
|---|---|---|
| 0 0 0 | $Lat_{Lo\text{-}000} - Lat_{Hi000}$ | $Long_{Lo\text{-}000} - Long_{Hi000}$ |
| . | . | . |
| . | . | . |
| . | . | . |
| 9 9 9 | $Lat_{Lo\text{-}999} - Lat_{Hi999}$ | $Long_{Lo\text{-}999} - Long_{Hi999}$ | where $Lat_{Lo\text{-}X}$–$Lat_{HiX}$ are the lower and upper bounds, respectively, for the latitude range for section code X, and $Long_{Lo\text{-}X}$–$Long_{HiX}$ are the lower and upper bounds, respectively, for the longitude range for that section code.

Incidentally, the section codes are numbered according to the frequency of usage so that a big city having a high frequency of usage such as Tokyo, Osaka, Yokohama or Nagoya is given priority to have a small number designation.

Moreover, the section code basically covers the area of a square of 900×900" (i.e., a square of 810,000 square seconds). In order to match the geography, however, the section code can be extended up to a square of 900,000" at the most or a latitudinally long region of 1,350×600" or a longitudinally long region of 450 to 1,800". In short, the section is composed of 1,000 blocks at the most.

As to the measures of the secondary mesh, moreover, the hard disk of the car navigation system 10 has the following table shown in TABLE II stored there so that the code numbers "000"" to "899", can specify the measures of the secondary mesh for each section while taking priority in the latitudinal direction from the lower left-hand side to the upper right-hand side in accordance with the positional relations in each section.

Specifically, the measures of the section are coded one-to-one with the code numbers as follows. The measure of the lower left-hand corner in the section is coded with the number "000"; the lowermost row is sequentially coded rightward with the numbers "001", "002" . . . "029"; and the row next to the bottom is sequentially coded leftward with the numbers "030", "031", . . . "059". From this point on, the measure of the higher right-hand corner is coded with the number "899".

In the following, these code numbers will be called the "block codes"; the individual measures of the secondary mesh will be called the "blocks"; and TABLE II will be called the "block code table".

TABLE II

| BLOCK CODE | CORRESPONDING SECTION LATITUDE | CORRESPONDING SECTION LONGITUDE |
|---|---|---|
| 0 0 0 | 0"–30" | 0"–30" |
| . | . | . |
| . | . | . |
| . | . | . |
| 8 9 9 | 8'30"–9'00" | 8'30"–9'00" |

The hard disk of the car navigation system 10 further has stored thereon measures of the ternary mesh according to rules similar to those of the block codes with the following table as enumerated in TABLE III, so that the code numbers "000" to "899" can specify the measures of the ternary mesh one-to-one for every block in accordance with the positional relations in each block. In the following these codes numbers will be called the "unit codes"; the individual measures of the ternary mesh will be called the "units"; and TABLE III will be called the "unit code table". Incidentally, the measures of this ternary mesh need not be equally sized.

TABLE III

| UNIT CODE | CORRESPONDING BLOCK LATITUDE | CORRESPONDING BLOCK LONGITUDE |
|---|---|---|
| 0 0 0 | 0"–1" | 0"–1" |
| . | . | . |
| . | . | . |
| . | . | . |
| 8 9 9 | 29"–30" | 29"–30" |

Figure 3:
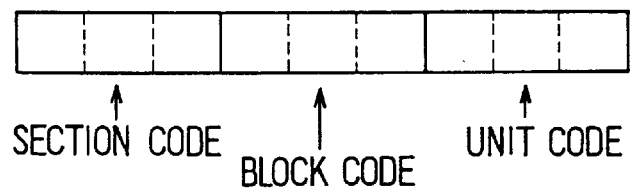
FIG. 3 is a schematic diagram showing a structure of an intrinsic code in the first embodiment.

Here, all the section codes are given different numbers, but the block codes are given the same code number in different sections, and the unit codes are given the same unit number in different blocks. This implies that a unit code of three digits cannot specify a single unit code. As shown in FIG. 3, however, a unit is expressed by nine digits joining the three codes composed of the section code, the block code and the unit code so that each code number thus made corresponds one-to-one to a single unit. This nine-digit code number will be called the "intrinsic code".

This intrinsic code is composed of the minimum units of a square having the latitude and longitude of 1" so that a nine-digit number at the most specifies any point in the region. The intrinsic code is composed of the section, block and unit portions each of three digits from the higher location. Moreover, the numeral 0 heading the codes are omitted from the intrinsic code.

Thus, there are 1,000×900×900=810,000,000 possible intrinsic codes from "000, 000, 000" to "999, 899, 899". However, all these different intrinsic codes need not be stored, but the block codes may be tabulated as 900 data points in an X-Y coordinate system having an origin at the lower left-hand latitude and longitude of each section whereas the unit codes may be tabulated as 900 data points in an X-Y coordinate system having an origin at the lower left-hand latitude and longitude of each block. In the present embodiment, therefore, the eight hundred and ten million intrinsic codes can be expressed if the table of tabulating the data has 1,000+900+900=2,800 data points in total.

From the relations of TABLES I–III, moreover, the absolute position of the unit of the intrinsic code="000, 899, 899" is specified by the longitude=(Long$_{Lo\text{-}000}$+8'30"+29") to (Long$_{Lo\text{-}000}$+8'30"+30") and the latitude=(Lat$_{Lo\text{-}000}$+8'30"+29") to (Lat$_{Lo\text{-}000}$+8'30"+30"). Therefore, the point corresponding to the intrinsic code "000, 899, 899" can be displayed in the screen if the map corresponding to the longitude=(Long$_{Lo\text{-}000}$+8'59") to (Long$_{Lo\text{-}000}$+9'00") and the latitude=(Lat$_{Lo\text{-}000}$+8'59") to (Lat$_{Lo\text{-}000}$+9'00") is read out from the database.

The map database itself is prepared according to the latitude and longitude coordinates so that the corresponding map can be read out from the database and displayed in the screen if the longitude=(Long$_{Lo\text{-}000}$+8'59") to (Long$_{Lo\text{-}000}$+9'00") and the latitude=(Lat$_{Lo\text{-}000}$+8'59") to (Lat$_{Lo\text{-}000}$+9'00") are specified by the region.

Other than the display on the screen, for example, if the intrinsic code="000, 899, 899" is inputted as a destination for searching the route, the target point can be specified with the region of the longitude=(Long$_{Lo\text{-}000}$+8'59") to (Long$_{Lo\text{-}000}$+9'00") and the latitude=(Lat$_{Lo\text{-}000}$+8'59") to (Lat$_{Lo\text{-}000}$+9'00").

In this embodiment, as described above, the section codes are numbered in accordance with the frequency of usage, and a big city having a high usage frequency such as Tokyo, Osaka, Yokohama or Nagoya is given a small designation. This is because the section code corresponds to the "large measure code" in the present invention and is intentionally set to reduce the number of significant digits by sharing the lower number in the code system of the section code.

Specifically, Tokyo is given the section code "000", and Osaka, Yokohama and Nagoya are given the respective section codes "001", "002" and "003". Since the heading numeral 0 is omitted from the intrinsic code, for Tokyo, all three digits of the section code can be omitted so that Tokyo can be expressed by a total of six digits which includes the three-digit block code and the three-digit unit code. For the section codes of Osaka, Yokohama and Nagoya, moreover, their section codes can be expressed by one digit "1", "2" and "3", respectively, by omitting the heading numeral 0 from their intrinsic codes. As a result, the individual points have the following intrinsic codes.

For example, the (latitude and longitude) for the section indicating the Tokyo area are expressed by (139° 37' 30", 35° 35' 00") for the lower left-hand corner in the section and (139° 52' 30", 35° 50' 00") for the upper right-hand corner. The intrinsic code of Tokyo Metropolitan Government (at 139° 41' 41", 35° 39' 56") has a section code "000", a block code "279" and a unit code "791" and is expressed by "000279791", having six significant digits which are "279791" by omitting the heading 0, as has been described before. Likewise, Tokyo Station (at 139° 46' 13", 35° 39' 26") has an intrinsic code "257793".

On the other hand, the section indicating the Nagoya area is expressed by (137° 52' 30", 35° 00' 00") for the lower left-hand corner in the section and (137° 07' 30", 35° 15' 00") for the upper right-hand corner. The intrinsic code of Nagoya City Office (at 136° 54' 33", 35° 09' 28") has a section code "0031", a block code "544" and a unit code "843" and is expressed by "003544843" with seven significant digits which are "3544843" by omitting the heading 0, as has been described before. Likewise, Nagoya Station (at 136° 53' 04", 35° 07' 37") has an intrinsic code "3451214".

Thus, the section code corresponding to the area such as a big city, which is thought to have a high usage frequency, has a small number of digits so that the number of digits of the whole intrinsic code can be reduced. This makes it convenient for the user to input the intrinsic code with less trouble to the area which is thought to have a high usage frequency.

Incidentally, one second of longitude corresponds to about 20 meters in Hokkaido, about 25 meters in Honshu (the main Japanese island) and about 30 meters in Okinawa, so that a point can be specified within a region of a square of about 30 meters by the intrinsic code. The region can perform, if having such area, the function sufficiently as a target point in the route searches.

An example of the optimum route guiding procedure in this embodiment will now be described. This procedure is started by designating the optimum route guiding mode from the control panel in the data setting and display unit 19 and is executed by the routine shown in FIG. 4.

First of all, the present position is located by GPS navigation and self-contained navigation and is set as a starting point (at Step S10). Next, the intrinsic code of the target point, as input from the control panel, is read in (at Step S20). On the basis of the higher three digits of the nine-digit intrinsic code, the section code table is referred to in order to determine the range of the latitude and longitude of the section (at Step S30).

With reference to the three numerals of the fourth to sixth places, moreover, the block code table is referred to in order to determine the range of the relative latitude and longitude of the block in the section (at Step S40). This range is added to the range of the latitude and longitude, as determined at Step S30, so that the block range is converted from the relative latitude and longitude to the absolute latitude and longitude (at Step S50).

On the basis of the three numerals on and lower than the seventh digit, the unit code table is then referred to in order to determine the relative range of the latitude and longitude of the unit in the block (at Step S60). This range is added to the range of the absolute latitude and longitude of the block, as determined at Step S50, so that the unit range, as determined at Step S60, is converted from the relative latitude and longitude to the absolute latitude and longitude (at Step S70). Thus, the target point can be specified as a region of a square of about 30 meters.

Next, the map data of the portion, as covered by this unit, is read out from the map database, and this map is displayed in the display screen (at Step S80). The driver moves the cursor on the display screen to decide the arriving point formally. In response to this decision of the arriving point by the driver (at Step S90), the general optimum route calculations are executed to determine the optimum route (at Step S100). After this, the display is returned to the map of the starting point, and the route guide is executed (at Step S110) according to the optimum route decided at Step S100.

Thus, in the first embodiment, the point is specified with the region of latitude×longitude=1"×1" by the intrinsic code which is defined for the unit capable of covering the map of the whole Japan. As a result, this region can be specified with the same intrinsic code even if a road is newly constructed to update the map database. Since, moreover, the intrinsic code defined in each unit is one unknown parameter of nine digits, the inputting order is not mistaken unlike the case in which the point is to be specified from both the latitude and longitude, and the inputting operation itself is simple.

Figure 4:
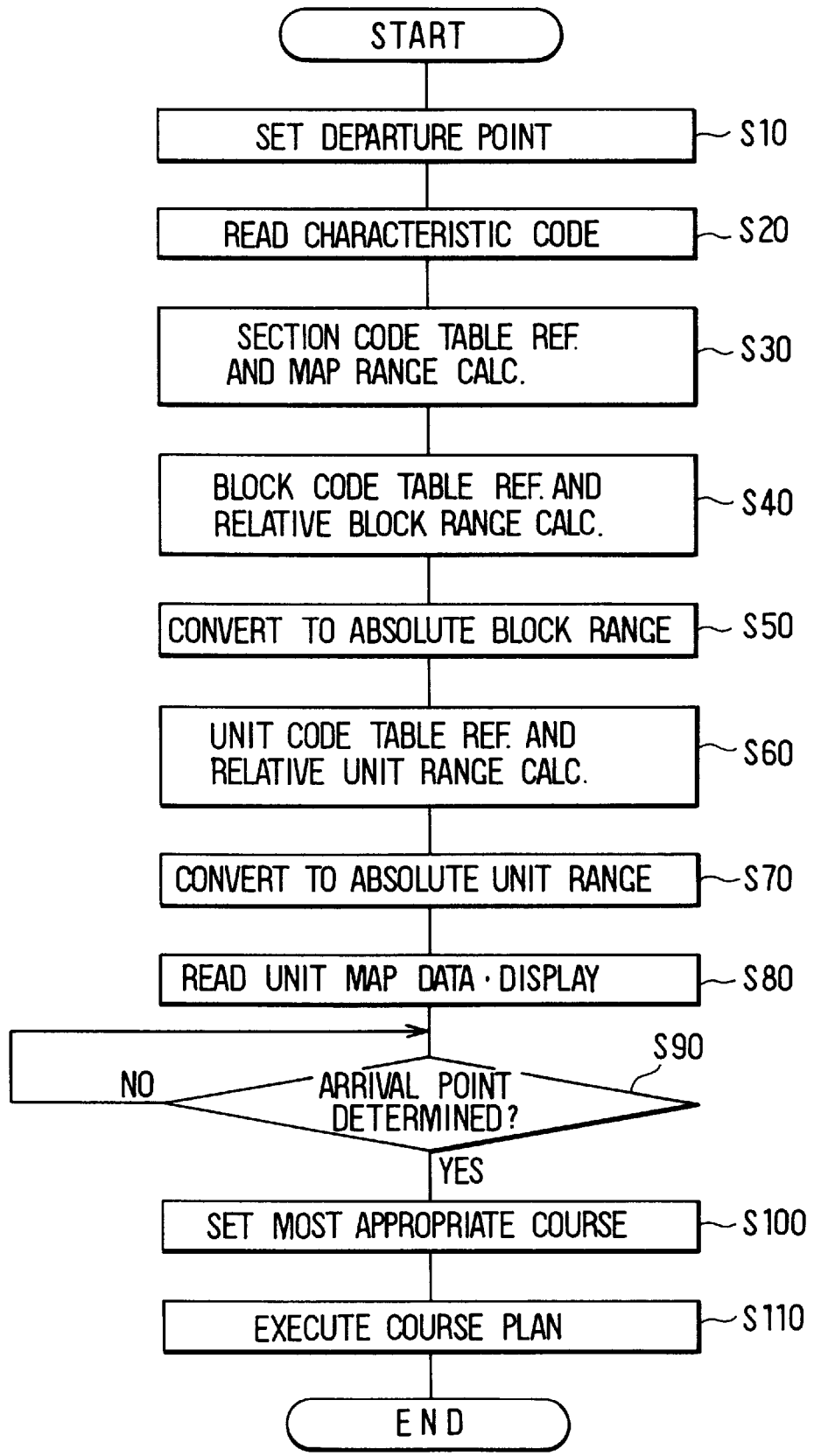
FIG. 4 is a flowchart showing a procedure for guiding a running route in the first embodiment.

Moreover, the first embodiment is constructed so that the inputting of "0", "00" and "000" heading the section code portion can be omitted when the intrinsic code is to be inputted. Specifically, the head "000" is deemed to have been omitted if the input has only six digits. In the aforementioned operation of S30, as shown in FIG. 4, based on the head "000", the section code table is referred to in order to determine the range of the latitude and longitude of the section. In this case, the region corresponds to the Tokyo area, as described above. If the input has only seven digits, on the other hand, the head "00" is deemed to have been omitted, and the section code is interpreted to have the sum of the higher digit and the "00" in the aforementioned operation of S30, as shown in FIG. 4. If the higher digit is "1", the section code is interpreted to be "001" having the "00" added. In this case, the region corresponds to the Osaka area. Likewise, if the input has only eight digits, on the other hand, the head "0" is deemed to have been omitted, and the section code is interpreted to have the sum of the higher two digits and the "0" in the aforementioned operation of Step S30, as shown in FIG. 4.

Thus, in the area having the higher usage frequency such as Tokyo, Osaka, Yokohama or Nagoya, a code having fewer digits can be inputted to simplify the inputting operations. If this section code is set, moreover, another advantage is that the code itself of a big city is easy to remember.

Incidentally, the first embodiment thus far described requires the manual inputting of the driver for the final arriving point. However, the construction may be as follows.

Figure 5:
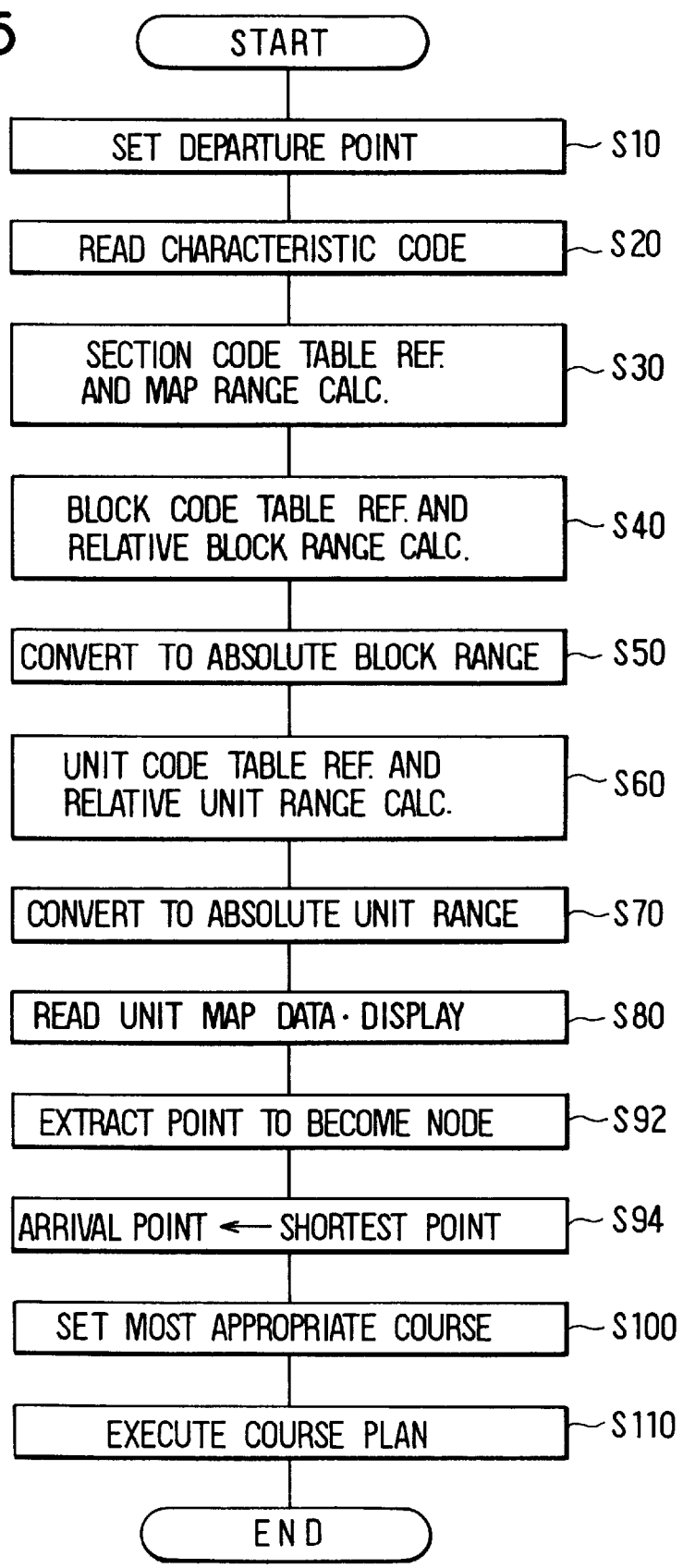
FIG. 5 is a flowchart showing a traveling route guiding procedure in a modification of the first embodiment.

Specifically, after the executions of the operations of Steps S10 to S80 like the aforementioned first embodiment (i.e., like Steps S10 to S80 of FIG. 4), as shown in the flowchart of FIG. 5, points or nodes such as the intersections on the road of the displayed map are extracted (at Step 92). Of these, the node for the shortest distance from the starting point is automatically set as the arriving point (at Step S94).

Figure 6:
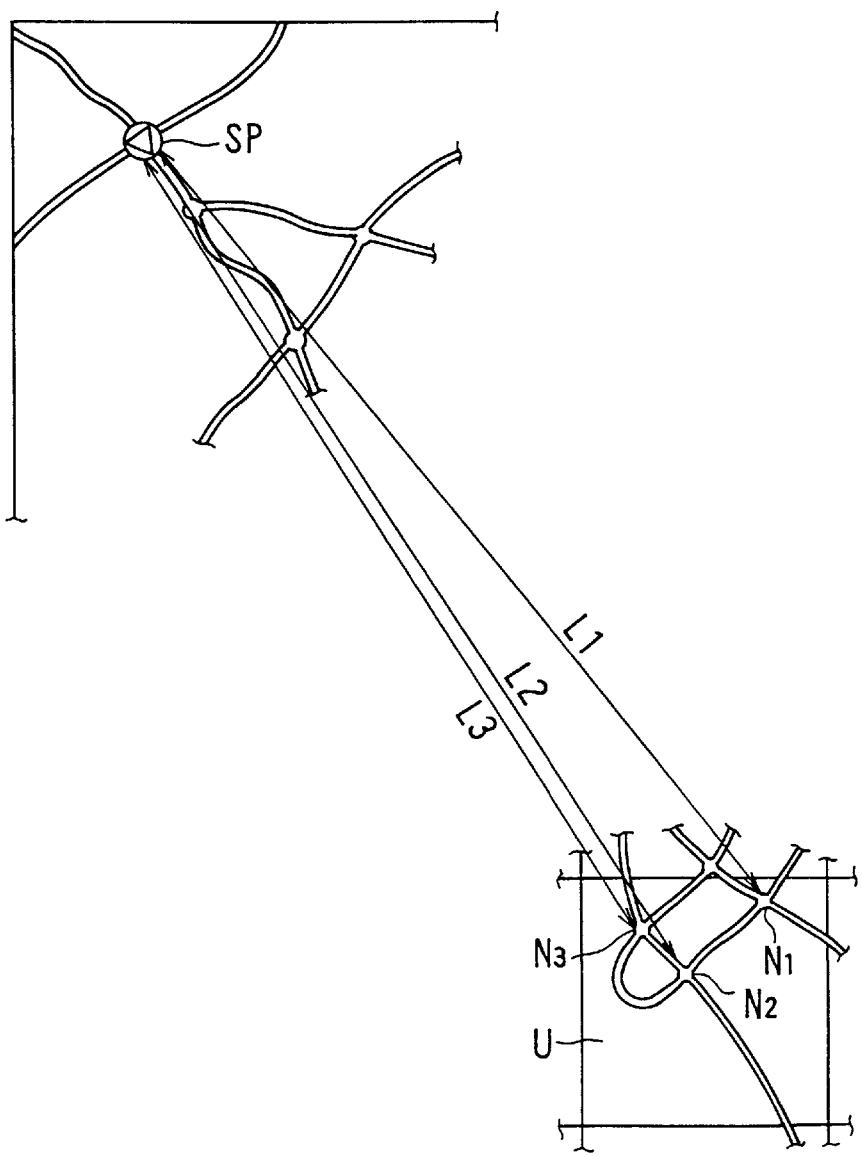
FIG. 6 is a diagram for explaining a point of the modification.

This will be schematically described with reference to FIG. 6. In this example, nodes N1 to N3 are extracted from the map corresponding to a unit U, and the straight distances L1 to L3 from a starting point SP are calculated so that the node N3 providing the shortest distance is set as the arriving point. Incidentally, no substantial difference would arise, as seen from FIG. 6, no matter which of the nodes N1 to N3 might be selected as the arriving point.

After this, the general optimum route calculations are executed, as in the foregoing first embodiment, to decide the optimum route, and the route guide is executed (at Steps S100 and S110). Incidentally, in this modification, the same operations as those of the first embodiment are designated by identical step numbers, and their description is therefore omitted for simplicity.

Second Embodiment

Figure 7:
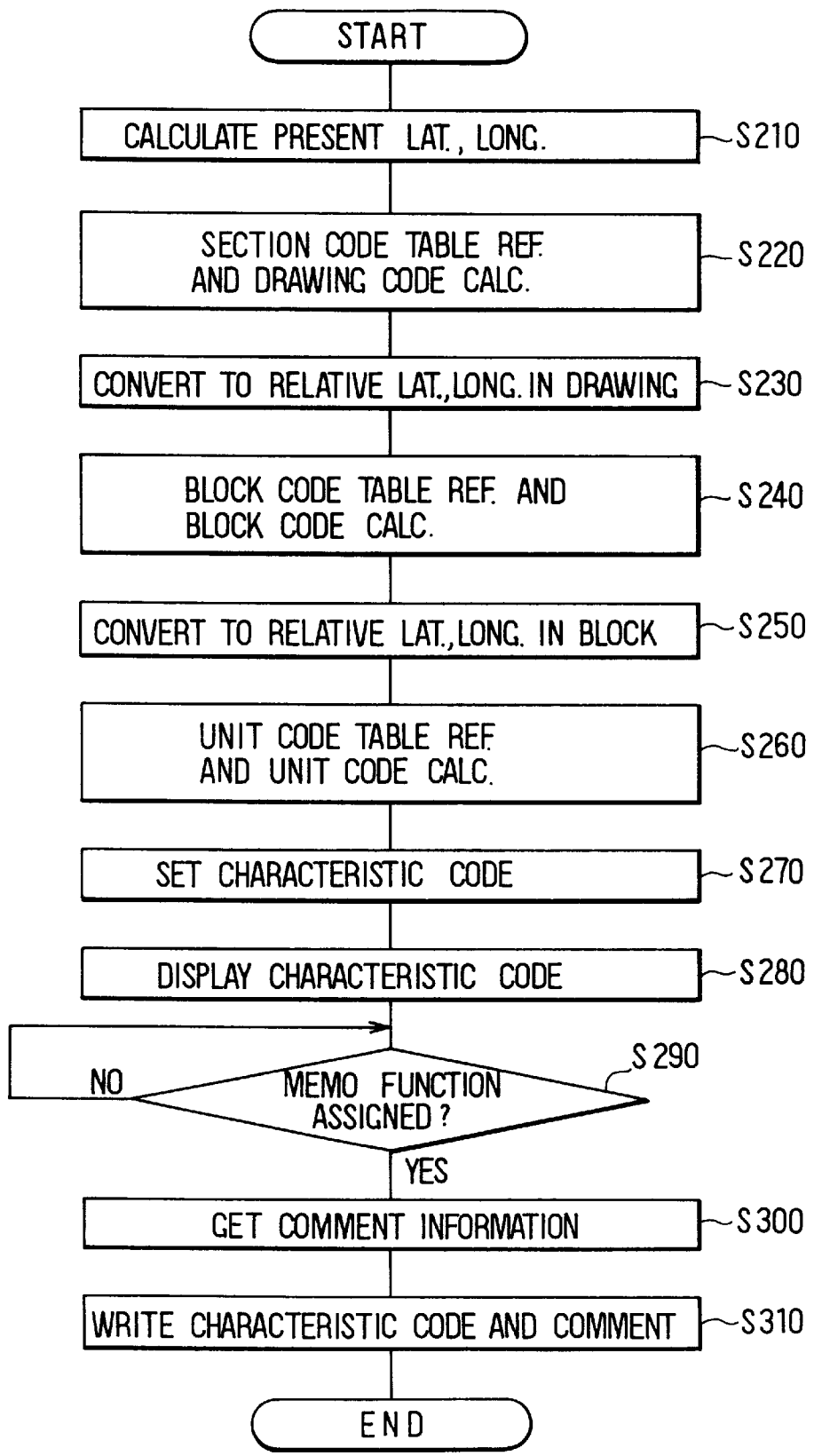
FIG. 7 is a flowchart showing a processing procedure in a code output mode in a second preferred embodiment of the present invention.

A routine of a second preferred embodiment of the present invention is started by designating the code output mode from the control panel and is executed by the procedure shown in FIG. 7.

First of all, the latitude and longitude of the present position of the vehicle are determined (at Step S210). Based on the latitude and longitude of the present position, the section code table is referred to in order to specify the section, and its code is determined (at Step S220).

Subsequently, the latitude and longitude of the lower left-hand corner of the section, as specified (at Step S220 ), are subtracted from the latitude and longitude of the present position of the vehicle, respectively, and are converted into the relative latitude and longitude in the section (at Step S230). On the basis of the relative latitude and longitude in this section, moreover, the block code table is referred to in order to specify the block thereby to determine its code (at Step S240).

Subsequently, the latitude and longitude of the lower left-hand corner of the block, as specified at Step S240, are respectively subtracted from the relative latitude and longitude in the section, as determined at Step S230, and are converted into the relative latitude and longitude in the block (at Step S250). On the basis of the relative latitude and longitude in the block, the unit code table is referred to in order to specify the unit thereby to determine the unit code (at Step S260).

When the section code, the block code and the unit code are thus determined, the nine-digit intrinsic code is determined (at Step S270) to have the section code, the block code and the unit code arranged sequentially from the first digit. This code number is output to the outside (at Step S280) by displaying it in the vicinity of the present position of the vehicle in the display.

If the driver designates the memo function (i.e., YES at S290), the comment information, as inputted from the control panel by the driver, is fetched by the RAM (at Step S300), and this information and the intrinsic code, as decided at Step S270, are related and written in the hard disk (at Step S310). The content thus written can be read out later if the comment information is inputted from the control panel.

If a place of special interest, e.g., a place optimal for viewing cherry blossoms, is found during a drive, for example, the code output mode can be started to store the intrinsic code together with comment information such as "good for cherry blossom viewing". If the driver wants to view cherry blossoms, the comment "good for cherry blossom viewing" is inputted to read out the intrinsic code. If this intrinsic code is designated as the target point to execute the routine guide, the vehicle can be easily guided to the place which has been discovered. Moreover, such information may be shared with other drivers merely by informing the other drivers of the intrinsic code.

Incidentally, without any storage with the comment information, when a third party is to be informed of the present position by a car telephone, for example, the intrinsic code may be displayed on the screen by the code output mode and read out, even if the place name is unknown. Alternatively, the intrinsic code need not be displayed in the screen but may be sent through the communication line to that third party. In this modification, the intrinsic code may conveniently be sent directly to the car navigation system owned by the third party so that the third party need not manually input it.

In this case, the position information has to be derived from the intrinsic code on the side of the car navigation system to which the intrinsic code has been sent. It is therefore necessary to store the conversion formula for converting the intrinsic code to be used.

The conversion formula of the latitude and longitude to be specified from the intrinsic code in that case is expressed by Equations (1) and (2):

$$\text{Long.}=A\_K[An]+(Bn \bmod A\_b[An])\times 30+(Un \bmod 30) \quad (1)$$

$$\text{Lat.}=A\_I[An]+INT(Bn \div A\_b[An])\times 30+INT(Un \div 30) \quad (2)$$

where

An=section code;

Bn=block code;

Un=unit code;

A=section defining table, composed of the three components of A_b, A_k and A_i;

A_b=number of latitude blocks in section;

A_k=longitude (in degrees, minutes and seconds of lower left-hand side of section;

A_I=latitude (in degrees, minutes and seconds) of lower left-hand side of section;

A_k[An]=value of A_k given to section code An by table;

Bn mod A_b[An]=reminder of division of Bn by $A_{13}$ b [An]; and

INT(Bn A_b[An]): integer portion of division of Bn by A_b.

Incidentally, the intrinsic code NC is expressed by Equation 3:

$$NC=An\times 10^6+Bn\times 10^3+Un \quad (3)$$

As a result, the positional information can be sent to a system which does not have the intrinsic code stored therein. Thus, the aforementioned conversion from the intrinsic code to the latitude and longitude are used when the positional information is sent to another system.

Third Embodiment

Figure 2:
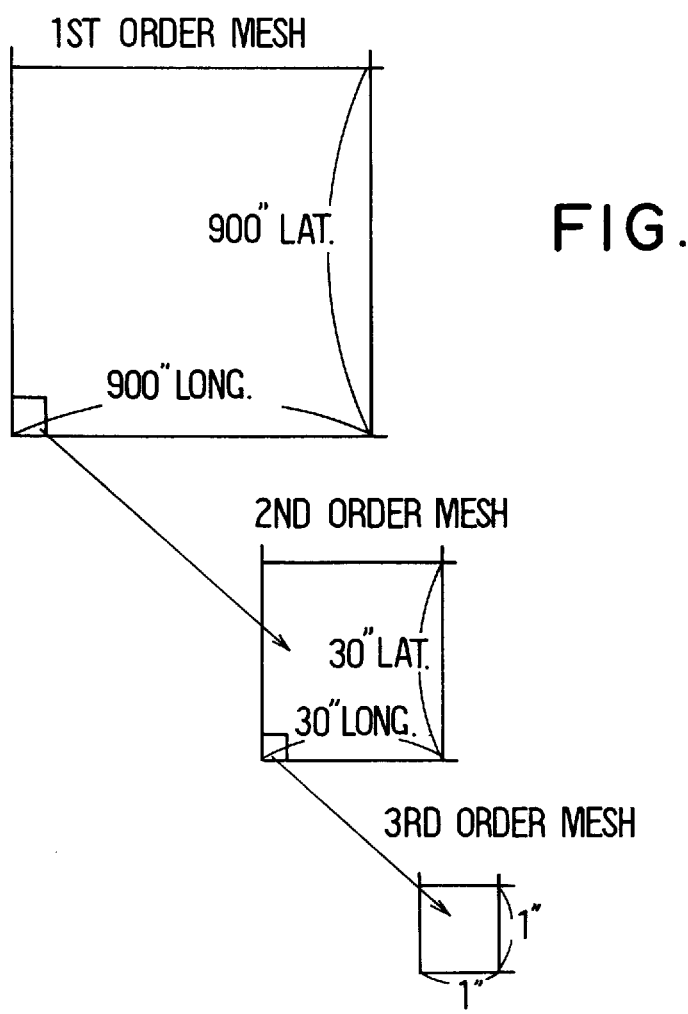
FIG. 2 is a schematic diagram showing a hierarchical structure of a map in a first embodiment.

In the foregoing first embodiment, a point is specified by using the intrinsic code which is defined for specifying the unit measures such as the primary to ternary meshes, as shown in FIG. 2; however, in a third embodiment, a point specifying function using the intrinsic code which is defined by another code system is used. Specifically, the "facility intrinsic codes", which individually correspond to predetermined facilities or objects on the map, are defined in a code system other than the aforementioned intrinsic code system so that the specific facilities can be directly specified by the facility intrinsic codes.

For example, the facility intrinsic codes corresponding to predetermined facilities are set, as follows:

Tokyo Station=Facility Intrinsic Code "1";

Sinjuku Station=Facility Intrinsic Code "2";

Tokyo Dome=Facility Intrinsic Code "3";

Tokyo Metropolitan Government=Facility Intrinsic Code "6";

Nagoya Station=Facility Intrinsic Code "31";

Nagoya Dome=Facility Intrinsic Code "33"; and

Nagoya City Office=Facility Intrinsic Code "36".

In this case, the facility intrinsic codes, individually corresponding to the major facilities thought to be highly necessary for the user to specify, such as public facilities or large-scaled companies or factories, are defined by a code system other than that for the intrinsic codes. Thus, the desired point (e.g., the corresponding facilities or their vicinities) can be directly specified by the facilities intrinsic codes so that the convenience of usage of the system improved.

By limiting the number of the predetermined facilities for the targets of the facility intrinsic codes, moreover, the number of digits required to represent the facility intrinsic codes themselves can be reduced. In the above-specified examples, the facility intrinsic codes are sequentially set from 1 so that a point or the like can be designated by one digit at a minimum. If the facility intrinsic codes are applied to a car navigation system, there are so many situations in which the designations and places to pass are to be specified at the facility unit that the number of digits for the codes for the point specifications is practically highly effective.

In order to reduce the number of digits of the facility intrinsic codes, as described above, it is naturally necessary to limit the predetermined number of facilities to be handled by the facility intrinsic codes. For other point specifications, therefore, it is preferable to premise and use jointly the point specifying method using the intrinsic codes which have been described in connection with the aforementioned first and second embodiments. Incidentally, in this joint use, it is naturally necessary to prevent the overlap between the intrinsic codes and the facility intrinsic codes. There are two possible methods to prevent overlapping: setting facility intrinsic codes to lower values than the number of digits of the intrinsic codes; and expressing the facility intrinsic codes using code groups (e.g., numbers or symbols) left unused in the intrinsic codes.

In the first method of setting the facility intrinsic codes to lower values than that of the intrinsic codes, if the block code of the intrinsic code is set from "001", for example, the minimum number to be imagined is "1000" even if the method of omitting the heading "0" is adopted. This is an omission of the heading five zeros when the section code, the block code and the unit code are "000", "001" and "000", respectively, so that the intrinsic code is "000001000". In this case, therefore, the whole intrinsic code never becomes smaller than three digits, the numbers 1 to 999, for example, will never overlap with the intrinsic code even if they are used as the facility intrinsic codes, so that proper processing can be achieved without any confusion.

On the other hand, when the facility intrinsic codes are to be expressed by using code groups (e.g., numbers or symbols) left unused in the intrinsic codes, it is conceivable to use the numbers above 900, that is, 900 to 999, by supposing that the block codes and the unit codes are set up to 899. This naturally means that the numbers should not be limited to 900 to 999 but that the level of 900 is used for the lower three digits. Thus, 1900 to 1999 or 2900 to 2999 by increasing one digit, or 10900 to 10999 by increasing another digit would not overlap the intrinsic code so that it can be used as the facility intrinsic code. These are examples for avoiding the overlap on the intrinsic codes. Thus, other various settings could be achieved to avoid the overlap of the two if the code systems of the intrinsic codes and the facility intrinsic codes are devised.

On the other hand, if the intrinsic codes are defined by three kinds of codes which are the section code, the block code and the unit code, the block code and the unit code can be replaced by the facility intrinsic codes. In other words, the area definition by the section code or the larger divided area range is used as is, and the predetermined facilities in the area are defined by the facility intrinsic codes. Thus, the rough range finding can be achieved by the section codes, and this method is effective if the operations of the user are considered when the method is applied to the navigation system, for example.

A specific example in which the section code corresponding to the Tokyo area is expressed by "001", the section code corresponding to the Nagoya area is expressed by "003", and the facility intrinsic codes are expressed by 900 to 999 left unused in neither the block code nor the unit code will be enumerated, as follows:

Tokyo Station=Section Code "001"+Facility Section Code "901";

Shinjuku Station=Section Code 001+Facility Section Code "902";

Tokyo Dome=Section Code "001"+Facility Section Code "903";

Tokyo Metropolitan Government=Section Code "001"+Facility Section Code "906";

Nagoya Station=Section Code "003"+Facility Section Code "901";

Nagoya Dome=Section Code "003"+Facility Section Code "903"; and

Nagoya City Office=Section Code "003"+Facility Section Code "906".

If the heading "0" may be omitted at the code inputting time, for example, Tokyo Station, Tokyo Dome and Nagoya Station can be expressed by four digits, i.e., "1901", "1903" and "3901", respectively.

In other words, when the facility intrinsic codes are to be serially set throughout the whole of the region, it is highly troublesome for the user to determine the facility intrinsic codes corresponding to the facilities they desire. When a rough range is to be found with the section codes, on the other hand, the facility intrinsic codes can be set, for example, by designating the district with the section code corresponding to the Tokyo area and then by considering only the range of the Tokyo area. As a result, the number of the facility intrinsic codes is naturally smaller than that of the case in which the whole range is to be covered, so that the code number of digits can be reduced. Because of the different section codes, as seen from the above-described specific example, Tokyo Station (1901) and Nagoya Station (3901) can be discriminated with the section codes even if the same facility intrinsic code "901" is used.

Moreover, the facility intrinsic codes of this case may be applied to facilities which may highly probably exist commonly in the regions divided by the section codes. These facilities are typically railway stations, local government offices, police stations, hospitals and post offices. Incidentally, if a plurality of facilities of the same kind are present, it is advisable to set the facilities which seem to be more important. If there exist a local post office and a central post office, for example, the more important central post office is set.

Thus, if only the facility intrinsic codes are remembered, they can then be generally used for any district by specifying the section code indicating that district thereby to enhance the convenience of use of the system. This will be explained in connection with the above-described specific example. If the number "901" is remembered as the facility intrinsic code for railway stations, Tokyo Station can be designated by using the section code "001" of the Tokyo area, and Nagoya Station can be designated by using the section code "003" of the Nagoya area. Likewise, if it is remembered that the facility intrinsic code for dome baseball stadiums is "903", Tokyo Dome and Nagoya Dome, and further Osaka Dome and Fukuoka Dome can be easily designated with their respective section codes.

Incidentally, it is arbitrary to properly consider what facility intrinsic codes are to be assigned to any facilities. It is conceivable to assign the code "110" to the police station and the code "119" to the hospital. This assignment will be reasoned in the following. When the system is applied to the car navigation system, for example, it is generally mounted on a vehicle. Thus, the code (or number) proper for the police station relating to the case of an accident or for the emergency hospital for receiving the injured person is preferable if it can be instantly remembered. Since "110" is the telephone number used to make an emergency call to police in Japan and "119" is the telephone number used to call an ambulance, these numbers are particularly appropriate for police stations and hospitals, respectively.

Incidentally, it is necessary in this case that the code series, as composed of the block code and the unit code of the intrinsic code, is devised to have neither the code "110"nor the code "119".

Although the present invention has been described in connection with the above preferred, it is not limited thereto, and variations are of course possible.

For example, the section of the primary mesh is given a uniform size of 900"×900" in the first embodiment but may be modified to a latitudinally long region of 1,350×600" or a longitudinally long region of 450 to 1,800". This modification may be applied to the secondary mesh and the ternary mesh.

Also, the third embodiment has been described in connection with the joint use of the intrinsic code and the facility intrinsic code while pointing out the necessity to devise the individual code system so that no overlap will occur; however, it is arbitrary to switch whether the inputs should resort to the intrinsic codes or the facility intrinsic codes. With this switching, the intrinsic codes and the facility intrinsic codes may overlap because they can be discriminated from the input modes. This raises the degree of freedom for setting the individual code systems.

When the intrinsic codes are used in the individual embodiments, moreover, the system may be constructed to specify the point with a telephone number in addition to the intrinsic code of the unit so that whether the code comes from the intrinsic code of the unit or the telephone number may be switched. Moreover, if the point is specified in this case with the intrinsic code, the telephone number of a building in the unit, as specified with that intrinsic code, can be outputted to the screen to specify the final arriving point of the route guide with that telephone number. This provides an advantage in that the arriving point can be specified merely by inputting the numerals while eliminating the operation of moving the cursor.

Additionally, a small map having a reduction ratio in the range of 900"×900" may be displayed when only the section code is inputted; a map covering the range of 30"×30" may be displayed when not only the section code but also the block code is inputted; and a map covering a range of 1"×1" may be displayed when the intrinsic code is inputted.

In addition, for example, the section code need not be of the fixed type but may be arbitrarily rewritten. This is because the section code for a region to be frequently used is given a small numeral in accordance with the address of the user for maximum convenience.

In the foregoing embodiments, on the other hand, the section code table and so on are stored in the car navigation system 10 but may be stored together with the map database in the CD-ROM.

For an applied range, for example, the intrinsic code may be additionally written for guiding the user to restaurants or museums in publications such as magazines. According to this modification, the route guide can be made to a restaurant which has been just opened so that it cannot be guided by the method of the prior art designating the site with a telephone number.

When there is an emergency, on the other hand, the function of the second embodiment may be utilized to guide the rescue team to the route by sending the intrinsic code of the present position of the vehicle. In this case, the driver of the troubled vehicle can call for the rescue team accurately even if the driver does not know his position well. Moreover, even if the map owned by the rescue team and the map belonging to the troubled vehicle are different versions, the intrinsic code is common. In this respect reliable rescue operations can be supported.

By using the intrinsic code, moreover, postal material can be delivered without any trouble to its destination. Especially in this case, too, a remarkable convenience can be achieved because there is no relationship to the novelty of the maps.

Such changes and modifications are to be understood as being included within the scope of the present invention as defined by the appended claims.

What is claimed is:

1. A method of designating points in a map, said method comprising the steps of:

dividing said map into map sections according to a predetermined coordinate system;

assigning unique indicia to said sections and to blocks of each of said sections, and assigning additional unique indicia to respective units of each of said blocks, whereby each unit is identifiable by an intrinsic code comprising a combination of the unique indicia for the section and block in which the unit is located and the unit's unique indicia, and wherein said indicia are alphanumeric characters, the indicia of at least one section having fewer significant characters than the indicia of said blocks of the sections; and designating a point within a selected section using the intrinsic code corresponding to a specific unit.

2. The method of claim 1, wherein the sizes of said map sections are equal.

3. The method of claim 1, wherein:

dividing said map into map sections produces a plurality of low-resolution portions; and wherein the dividing step further includes dividing each of said plurality of low-resolution portions into said blocks and units producing a plurality of increasingly higher resolution portions, said plurality of higher resolution portions of each of said low-resolution portions collectively constituting said plurality of map sections.

4. The method of claim 3, wherein each intrinsic code includes a first unique part and a second part duplicated in intrinsic codes for other of said units.

5. The method of claim 4, wherein:

said first unique part has fewer significant digits than said first unique part in intrinsic codes for other of said units; and said second part has the said number of significant digits as said second part in intrinsic codes for other of said units.

6. The method of claim 1, wherein said indicia having fewer significant characters is established in accordance with the frequency of anticipated access to a corresponding section of said map.

7. The method of claim 1, further comprising the step of storing assignments of said indicia on a computer-readable medium.

8. The method of claim 1, wherein said step of assigning additional unique indicia includes the step of:

generating said additional unique indicia as being representative of a facility within a section.

9. The method of claim 8, wherein said additional unique indicia are identical for at least two intrinsic codes representing a predetermined type of facility at different locations.

10. The method of claim 1, further comprising the steps of:

assigning additional alphanumeric characters as a facility intrinsic code representative of a facility located within an area covered by said map; and designating a facility using the facility intrinsic code corresponding to said facility.

11. The method of claim 10, wherein said facility intrinsic code has fewer significant characters than said intrinsic code.

12. The method of claim 10, wherein said facility intrinsic code uses a group of characters not used in said intrinsic code.

13. The method of claim 10, further comprising the steps of:

designating a point within a selected section or a facility by selectively switching to use an intrinsic code or a facility intrinsic code, respectively.

14. The method of claim 1, further comprising the steps of:

displaying only a selected section of the map by using only that portion of the intrinsic code which comprises the unique indicia for the selected section.

15. The method of claim 1, further comprising the steps of:

displaying only a selected block of the map by using only the portion of the intrinsic code which comprises the unique indicia for the selected block and the section in which the selected block is located.

16. A method of setting a point in a navigation system, said method comprising the steps of:

receiving an intrinsic code comprising unique alphanumeric indicia representative of said point, said code being selected from a plurality of said intrinsic codes wherein a first part of said indicia in said plurality of intrinsic codes has a number of significant digits which is less than a further part of the indicia in said plurality of intrinsic codes;

accessing a portion of a map database based on said received intrinsic code to obtain data corresponding to said point; and using said data to perform navigation.

17. The method of claim 16, wherein:

said further part of the indicia in each of said plurality of intrinsic codes has a same number of significant digits; and said accessing step includes the steps of:

selecting a first portion of said map database based on said first part of said indicia in the received intrinsic code; and selecting a second portion of said map database within said first portion of the database based on said further part of said indicia in the received intrinsic code to obtain said data.

18. The method of claim 17, wherein a portion of said further part of said indicia in the received intrinsic code corresponds to a facility represented in said first portion of said map database.

19. The method of claim 18, wherein:
said portion of said further part of said indicia in the received intrinsic code is identical to a corresponding portion of said further part in said plurality of intrinsic codes; and wherein:
facilities corresponding to said portions of said further parts are of a same type.

20. The method of claim 16, wherein said first parts of the indicia of said intrinsic codes represent geographical sections which are equal to one another in size.

21. The method of claim 16, wherein portions of said map database corresponding to geographic locations frequently accessed correspond to first parts of indicia in said intrinsic codes having a lower number of significant digits than first parts of indicia in intrinsic codes representing geographic locations less frequently accessed.

22. The method of claim 16, further comprising the steps of:
receiving a memo notation describing said point;
associating said notation with said point;
inputting a description of said point on a map; and
receiving said intrinsic code based on said description.

23. The method of claim 16, further comprising the steps of:
receiving additional unique alphanumeric indicia as a facility intrinsic code representative of a facility located within an area covered by said map; and
accessing a portion of said map database based on said received facility intrinsic code to obtain data corresponding to said facility; and
using said data corresponding to the facility to perform navigation.

24. The method of claim 23, wherein said facility intrinsic code has fewer alphanumeric indicia than said intrinsic code.

25. The method of claim 23, wherein said facility intrinsic code uses a group of alphanumeric indicia not used in said intrinsic code.

26. The method of claim 23, further comprising the step of:
accessing a point or a facility by selectively switching to use an intrinsic code or a facility code, respectively.

27. A system for performing navigation, said system comprising:
a map database;
input means for receiving an intrinsic code comprising unique alphanumeric indicia representative of a point, said code being selected from a plurality of said intrinsic codes wherein a first part of said indicia in said plurality of intrinsic codes has a number of significant digits which is less than a further part of the indicia in said plurality of intrinsic codes;
database accessing means for accessing a portion of said map database based on said received intrinsic code to obtain data corresponding to said point; and
control means for controlling said navigation system to perform navigation based on said data.

28. The system of claim 27, wherein:
said further part of the indicia in each of said plurality of intrinsic codes has the same number of significant digits; and
said database accessing means includes:
first portion selecting means for selecting a first portion of said map database based on said first port of said indicia in the received intrinsic code; and
second portion selecting means for selecting a second portion of said map database within said first portion of the database based on said further part of said indicia in the received intrinsic code to obtain said data.

29. The system of claim 28, wherein a portion of said further part of said indicia in the received intrinsic code corresponds to a facility represented in said first portion of said map database.

30. The system of claim 29, wherein:
said portion of said further part of said indicia in the received intrinsic code is identical to a corresponding portion of said further part in said plurality of intrinsic codes; and wherein:
facilities corresponding to said portions of said further parts are of a same type.

31. The system of claim 27, wherein said first parts of the indicia of said intrinsic codes represent geographical sections which are equal to one another in size.

32. The system of claim 27, wherein portions of said map database corresponding to geographic locations frequently accessed correspond to first parts of indicia in said intrinsic codes having a lower number of significant digits than first parts of indicia in intrinsic codes representing geographic locations less frequently accessed.

33. The system of claim 27, further comprising:
memo receiving means for receiving a memo notation describing said point;
associating means for associating said notation with said point;
description inputting means for inputting a description of said point on a map; and
intrinsic code receiving means for receiving said intrinsic code based on said description.

34. The system of claim 27, further comprising display means for displaying a map corresponding to said data from said map database accessed by said database accessing means.

35. The system of claim 27, wherein said input means further receives additional alphanumeric indicia as a facility intrinsic code representative of a facility located within an area covered by said map; and wherein:
said database accessing means accesses a portion of said map database based on said received facility intrinsic code to obtain data corresponding to said facility; and
said control means controls said navigation system to perform navigation based on the data corresponding to the facility.

36. The system of claim 35, wherein said facility intrinsic code has fewer alphanumeric indicia than said intrinsic code.

37. The system of claim 35, wherein said facility intrinsic code uses a group of alphanumeric indicia not used in said intrinsic code.

38. The system of claim 35, further comprising:
switching means connected to the database accessing means for selectively accessing a portion of the map database based on the intrinsic code or the facility code.

* * * * *